(12) United States Patent
Mishra et al.

(10) Patent No.: US 8,508,674 B2
(45) Date of Patent: Aug. 13, 2013

(54) OPTICALLY INTELLIGENT IMAGE SENSING DEVICE

(71) Applicants: Vijay Mishra, Juanpur (IN); Karthik Venkatraman, Chennai (IN)

(72) Inventors: Vijay Mishra, Juanpur (IN); Karthik Venkatraman, Chennai (IN)

(73) Assignee: Empire Technology Development, LLC, Wilmington, DE (US)

( * ) Notice: Subject to any disclaimer, the term of this patent is extended or adjusted under 35 U.S.C. 154(b) by 0 days.

(21) Appl. No.: 13/709,670

(22) Filed: Dec. 10, 2012

(65) Prior Publication Data

US 2013/0100361 A1    Apr. 25, 2013

Related U.S. Application Data

(63) Continuation of application No. 12/648,081, filed on Dec. 28, 2009, now Pat. No. 8,351,017.

(30) Foreign Application Priority Data

Aug. 26, 2009    (IN) .......................... 2047/CHE/2009

(51) Int. Cl.
*G02F 1/13*    (2006.01)
(52) U.S. Cl.
USPC ............... 349/2; 349/12; 349/116; 349/199; 345/173; 345/174; 345/175; 345/207
(58) Field of Classification Search
None
See application file for complete search history.

(56) References Cited

U.S. PATENT DOCUMENTS

| | | | |
|---|---|---|---|
| 5,289,304 A | 2/1994 | Phuvan | |
| 5,392,035 A | 2/1995 | Yoshikawa | |
| 6,041,190 A | 3/2000 | Kikuchi et al. | |
| 6,162,569 A | 12/2000 | Nakashima et al. | |
| 6,262,782 B1 | 7/2001 | Yamazaki et al. | |
| 7,298,558 B2 | 11/2007 | Campbell et al. | |
| 8,139,041 B2 * | 3/2012 | Na ................................ | 345/173 |

(Continued)

FOREIGN PATENT DOCUMENTS

| WO | 98/52096 | 11/1998 |
|---|---|---|
| WO | 2009/093388 | 7/2009 |

OTHER PUBLICATIONS

International Search Report for application with application No. PCT/IB2010/001966 mailed Dec. 1, 2010.

(Continued)

*Primary Examiner* — Thanh-Nhan P Nguyen
(74) *Attorney, Agent, or Firm* — Moritt Hock & Hamroff LLP; Steven S. Rubin, Esq.

(57) ABSTRACT

An optically intelligent image sensing device is provided. By applying different potentials across different electrode sections in the image sensing device, the electric field profiles of the corresponding liquid crystal layer sections bend the lights passing through the liquid crystal layer sections in a predetermined manner. In one embodiment, all of a certain color light entering the image sensing device can be bent towards a color filter for the specific color, thereby entering the light sensor for the specific color light. Accordingly, the optically intelligent image sensing device has improved optical efficiency. An arrangement for an array of different electrode and light sensing sections in the image sensing device is also provided as an example for how each electrode may be connected to the optically intelligent image sensing device control signals. An example using the present optically intelligent image sensing device to improve the optical efficiency of an image capturing device is also described.

20 Claims, 3 Drawing Sheets

(56) References Cited

U.S. PATENT DOCUMENTS

| | | |
|---|---|---|
| 2008/0036951 A1 | 2/2008 | Tsai et al. |
| 2009/0102763 A1 | 4/2009 | Border et al. |
| 2010/0271335 A1 | 10/2010 | Gotoh et al. |
| 2012/0218239 A1* | 8/2012 | Yao et al. .................... 345/207 |

OTHER PUBLICATIONS

McManamon, Paul F., et al., Optical Phased Array Technology, Proceedings of the IEEE, 1996, vol. 84, No. 2.

Ahmad, M. A., et al. Investigations of Indium Tin Oxide-Barium Strontium Titanate-Indium Tin Oxide Heterostructure for Tunability, IEEE Microwave and Wireless Compopnents Letter, Jun. 2008, pp. 398-400, vol. 18, No. 6.

Fan, Y., et al., Liquid Crystal Microlens Arrays with Switchable Positive and Negative Focal Lengths, IEEE/OSA Journal of Display Technology, 2005, pp. 151-156, vol. 1, Issue 1.

Ren, H., et al., Adaptive Lens Using Liquid Crystal Concentration Redistribution, Applied Physics Letters, 2006, 191116, vol. 88, Issue 19.

Ren, H., et al., Tunable-Focus Flat Liquid Crystal Spherical Lens, Applied Physics Letters, Jun. 7, 2004, pp. 4789-4791, vol. 84, No. 23.

* cited by examiner

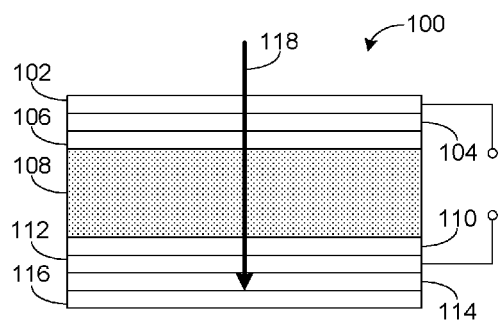
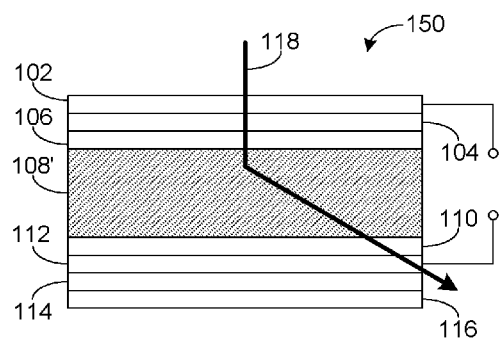
FIGURE 1A    FIGURE 1B
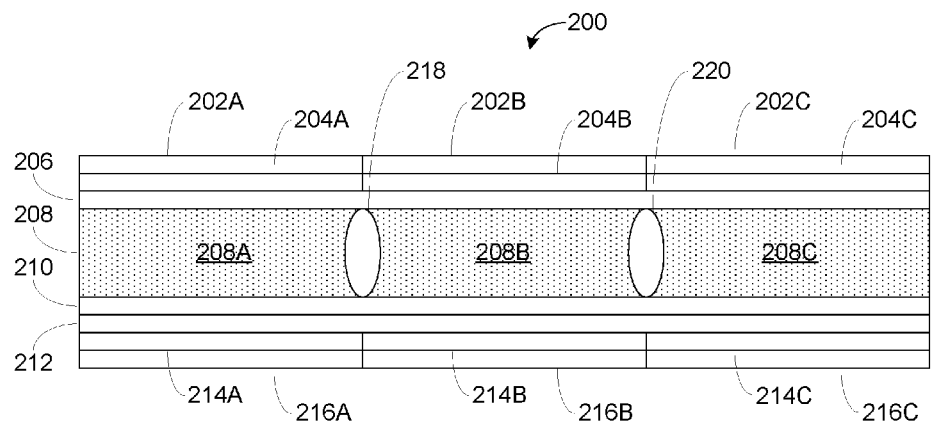
FIGURE 2

OPTICALLY INTELLIGENT IMAGE SENSING DEVICE

CROSS REFERENCE TO RELATED APPLICATIONS

This application claims priority to Indian Patent Application Serial No. 2047/CHE/2009 filed Aug. 26, 2009, the contents of which are incorporated by reference herein in its entirety.

BACKGROUND

Liquid crystals are a type of substance having different phases of matter, including a phase that exhibits properties between those of a conventional liquid and those of a solid crystal. For instance, a liquid crystal may flows like a liquid while maintaining some of the ordered structure characteristic of crystals. Each of these phases can be distinguished by different optical properties. When viewed under a microscope using a polarized light source, different liquid crystal phases will appear to have distinct textures. The contrasting areas in the textures correspond to domains wherein liquid crystal molecules are oriented in different directions.

One popular application of liquid crystals is liquid crystal displays (LCDs), which rely on the optical properties of certain liquid crystalline substances in the presence or absence of an electric field to generate a display image. In common liquid crystal display devices, the liquid crystal layer sits between two orthogonal polarizers with the liquid crystal alignment chosen so that its relaxed phase is a twisted one. This twisted phase reorients light that has passed through the first polarizer, allowing its transmission through the second polarizer, and further allowing the light to be reflected back to the observer. Under this configuration, the liquid crystal device appears transparent.

When a voltage is applied across the liquid crystal layer, an electric field forms within the liquid crystal layer, and the liquid crystal molecules begin to align parallel to the electric field, gradually untwisting in the center of the liquid crystal layer. In this state, the liquid crystal molecules do not reorient light, so the light polarized at the first polarizer is absorbed at the second polarizer, and the device accordingly loses transparency. The loss of transparency increases with increasing voltage across the liquid crystal layer. As such, voltage applied across the liquid crystal layer can be used switch a pixel between being transparent or being opaque. Color LCD systems follow a similar technique, using color filters used to generate colored pixels.

SUMMARY

An optically intelligent image sensing device is provided. The image sensing device includes a light sensing layer, a color filter layer above the light sensing layer, a first glass substrate above the conduction electrode layer, a liquid crystal layer above the first glass substrate, a second glass substrate above the liquid crystal layer, a transparent resistive layer, and an electrode layer, wherein applying a voltage across the conduction electrode layer and the electrode layer generates a three-dimensional electric field profile in the liquid crystal layer. In this embodiment, applying a first voltage across the conduction electrode layer and the electrode layer generates a first three-dimensional electric field profile in the liquid crystal layer such that a light entering the liquid crystal layer is bent at a first angle. Further, applying a second voltage across the conduction electrode layer and the electrode layer generates a second three-dimensional electric field profile in the liquid crystal layer such that a light entering the liquid crystal layer is bent at a second angle.

In another embodiment, the image sensing device includes a light sensing layer comprising a first pixilated light sensing structure and a second pixilated light sensing structure, a color filter layer above the light sensing layer comprising a first color filter structure and a second color filter structure, wherein the first color filter structure is aligned with the first pixilated light sensing structure and the second color filter structure is aligned with the second pixilated light sensing structure, a transparent conduction electrode layer above the color filter layer, a first glass substrate above the transparent conduction electrode layer, a liquid crystal layer above the first glass substrate, a spacer within the liquid crystal layer, wherein the spacer splits the liquid crystal layer into a first liquid crystal section aligned with the first pixilated light sensing structure and a second liquid crystal section aligned with the second pixilated light sensing structure, a second glass substrate above the liquid crystal layer, a transparent resistive layer comprising a first pixilated resistive structure and a second pixilated resistive structure, wherein the first pixilated resistive structure is aligned with the first color filter structure and wherein the second pixilated resistive structure is aligned with the second color filter structure, and an electrode layer comprising a first pixilated electrode structure and a second pixilated electrode structure, wherein the first pixilated electrode structure is aligned with the first color filter structure and wherein the second pixilated electrode structure is aligned with the second color filter structure, wherein applying a voltage across the transparent conduction electrode layer and the first pixilated electrode structure generates a three-dimensional electric field profile in the first liquid crystal section. The image sensing device also includes a second spacer, wherein the spacer and the second spacer split the liquid crystal layer into the first liquid crystal section aligned with the first pixilated light sensing structure, the second liquid crystal section aligned with the second pixilated light sensing structure, and a third liquid crystal section, wherein the light sensing layer further comprises a third pixilated light sensing structure aligned with the third liquid crystal section, wherein the color filter structure further comprises a third color filter structure aligned with the third liquid crystal section, wherein the transparent resistive layer further comprises a third pixilated resistive structure aligned with the third liquid crystal, and wherein the electrode layer further comprises a third pixilated electrode structure aligned with the third crystal liquid layer, wherein applying a voltage across the transparent conduction electrode layer and the first pixilated electrode structure generates a three-dimensional electric field profile in the first liquid crystal section.

In this embodiment, applying a second voltage across the transparent conduction electrode layer and the second pixilated electrode structure generates a second three-dimensional electric field profile in the second liquid crystal section and wherein applying a third voltage across the transparent conduction electrode layer and the third pixilated electrode structure generates a third three-dimensional electric field profile in the third liquid crystal section. The three-dimensional electric field profile allows a light entering the first liquid crystal section to pass through into the first color filter structure. Further, the second three-dimensional electric field profile bends a light entering the second liquid crystal section towards the first spacer and into the first color filter structure. In addition, the second three-dimensional electric field profile bends a light entering the second liquid crystal section towards the second spacer and into the third color filter structure.

A method for image sensing is also provided. The method includes receiving incoming light at an electrode layer, passing the light through the electrode layer to a liquid crystal layer below the electrode layer, wherein the liquid crystal layer has a three-dimensional electric field profile, wherein the three-dimensional electric field profile is generated by applying a voltage across the electrode layer and a conduction electrode layer below the liquid crystal layer, passing the light through a color filter, and passing the light from the color filter into a light sensing layer.

The method also includes applying a second voltage across the electrode layer and conduction electrode layer generates a second three-dimensional electric field profile, resulting in passing the light through a second color filter and passing the light from the second color filter into a second light sensing layer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The embodiments will be further elucidated by means of the following description and the appended drawings.

FIG. 1A is an illustrative diagram of an example image sensing device structure having a potential applied across an electrode layer and a conduction electrode layer.

FIG. 1B is an illustrative diagram of the example image sensing device of FIG. 1A having a different potential applied across the electrode layer and the conduction electrode layer.

FIG. 2 is an illustrative diagram of an example pixel structure for a three-color image sensing device.

DETAILED DESCRIPTION

Figure 3:
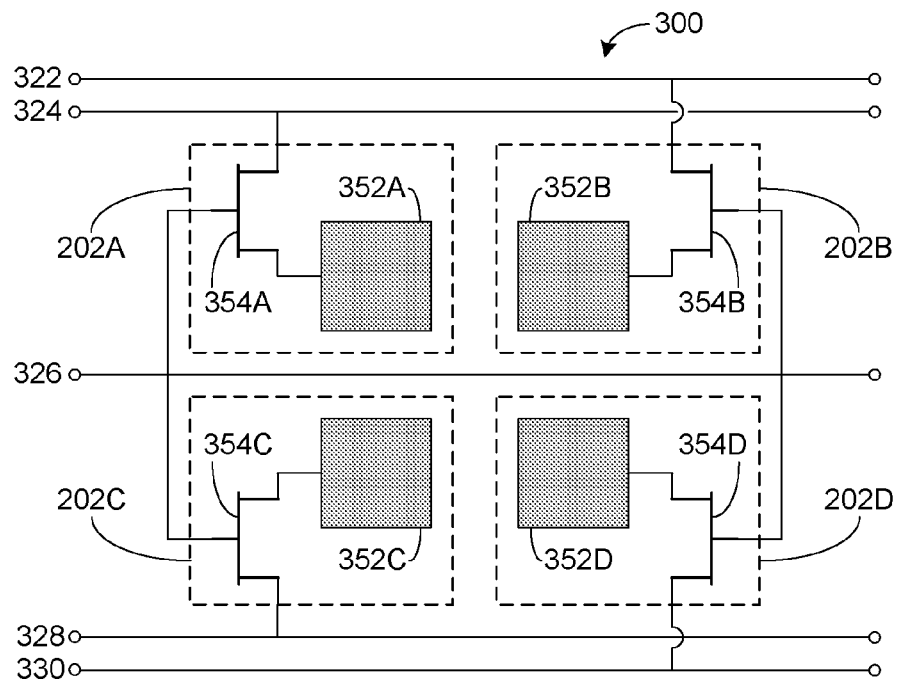
FIG. 3 is an illustrative diagram of a circuit block diagram for an example image sensing pixel.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

FIG. 1A shows an image sensing device structure 100 having an electrode layer 102, a resistive layer 104, a first glass substrate 106, a liquid crystal layer 108, a second glass substrate 110, a conduction electrode layer 112, a color filter layer 114 and a light sensing layer 116. The color filter layer 114 is placed above the light sensing layer 116; the conduction electrode layer 112 is placed above the color filter layer 114; the second glass substrate 110 is placed above the conduction electrode layer 112; the liquid crystal layer 108 is placed above the second glass substrate 110; the first glass substrate 106 is placed above the liquid crystal layer 108; the resistive layer 104 is placed above the first glass substrate 106; and the electrode layer 102 is placed above the resistive layer 104.

The liquid crystal layer 108 is housed between the first glass substrate 106 and the second glass substrate 110. In one embodiment, the electrode layer 102, resistive layer 104 and conductive layers are transparent to light, and the electrode layer may be of indium tin oxide (ITO) material. A potential may be applied across the electrode layer 102 and the conduction layer 112 to control an electric field profile within the liquid crystal layer 108. In FIG. 1A, the potential applied across the electrode layer 102 and conduction electrode layer 112 creates an electric field profile within the liquid crystal layer 108 such that light entering the image sensing device 100 passes straight through the liquid crystal layer 108 without being bent, and enters the light sensing layer 116. In one embodiment, the light sensing layer 116 may be a charge-coupled device (CCD) layer. The color filter layer 114 may be a red filter, green filter, or blue filter. The color filter layer 114 may also be used to filter out all light.

FIG. 1B shows a second image sensing device 150 having a structure similar to the image sensing device 100 of FIG. 1A, including the same electrode layer 102, resistive layer 104, first glass substrate 106, second glass substrate 110, conduction electrode layer 112, color filter layer 114 and light sensing layer 116. In the second image sensing device 150, however, a different potential is applied across the electrode layer 102 and the conduction electrode layer 112. The different potential applied across the electrode layer 102 and the conduction electrode layer 112 results in a liquid crystal layer 108' having a different electric field profile. Due to the different electric field profile, the light entering the image sensing device 150 bends and does not enter the light sensing layer 116. As shown, different potentials applied across the electrode layer 102 and conduction electrode layer 112 creates different electric field profiles in the liquid crystal layer 108, thereby controlling how the light entering image sensing device 100 is bent when passing through the liquid crystal layer 108.

FIG. 2 shows a pixel structure for a three-color image sensing device 200. Each color component of the pixel structure 200 is similar to the image sensing device 100. The pixel structure 200 includes an electrode layer having a first electrode section 202A, a second electrode section 202B and a third electrode section 202C. The pixel structure 200 further includes a resistive layer positioned below the electrode layer, having a first resistive section 204A aligned with the first electrode section 202A, a second resistive section 204B aligned with the second electrode section 202B and a third resistive section 204C aligned with the third electrode section 202C. A liquid crystal layer 208, housed between a first glass substrate 206 and a second glass substrate 210 is positioned below the resistive layer. Below the second glass substrate 210 is a conduction layer 212 and below the conduction layer 212 is a color filter layer including a first color filter section 214A aligned with the first resistive section 204A, a second color filter section, a second color filter section 214B aligned with the second resistive section 204B, and a third color filter section 214C aligned with the third resistive section 204C. Below the color filter layer is a light sensing layer including a first light sensing section 216A aligned with the first color filter section 214A, a second light sensing section 216B aligned with the second color filter section 214B and a third light sensing section 216C aligned with the third light sensing section 214C.

The liquid crystal layer 208 may also include a first spacer 218 and a second spacer 220. The first spacer 218 may be positioned such that it is aligned with the intersection between the first light sensing section 216A and the second light sensing section 216B. Similarly, the second spacer 220 may be positioned such that it is aligned with the intersection between the second light sensing section 216B and the third light sensing section 216C. The positions of the first spacer 218 and the second spacer 220 demarcates the liquid crystal layer 208 into a first liquid crystal section 208A aligned with the first light sensing section 216A, a second liquid crystal section 208B aligned with the second light sensing section 216B and a third liquid crystal section 208C aligned with the third light sensing section 216C. In one embodiment, the first spacer 218 and second spacer 220 may be convex lens-shaped spacers. Similar to the image sensing device structure 100 of FIG. 1A, the color filter sections 214A, 214B and 214C may be red, green, blue and/or black filters.

As mentioned above, each aligned section of the three-color image sensing device 200 is structurally and functionally similar to the image sensing device structure 100 of FIG. 1A. In one embodiment of the three-color image sensing device 200, the first spacer 218 and second spacer 220 are convex lens-shaped, and the color filter sections 214A, 214B and 214C are a red filter, a green filter and a blue filter, respectively. When light enters the three-color image sensing device 200, a default potential may be applied across each of the first electrode section 202A, second electrode section 202B and third electrode section 202C, and the conduction electrode layer 212 such that all of the light passes through the liquid crystal sections 208A, 208B and 208C without being bent, and enters the respective light sensing sections 216A, 216B and 216C via the filters 214A, 214B and 214C.

If the light entering the three-color image sensing device 200 is a green light, and the default potential is applied such that the light passes through each of the liquid crystal sections 208A, 208B and 208C, the green light will be filtered out by the red color filter 214A and the blue color filter 214C, and only pass through the green color filter 214B, entering the second light sensing section 216B. As such, only approximately one third of the light is passed through and received by the second light sensing section 216B, and the remaining approximately two thirds of the green light is simply lost through the red color filter 214A and the blue color filter 214C.

In a similar case of when the light entering the three-color image sensing device 200 is a green light, a first potential may be applied between the first electrode section 202A and the conduction electrode 212, generating an electric field within the liquid crystal section 208A and bending the green light passing through the liquid crystal section 208A, similar to the case of second image sensing device 150 shown in FIG. 1B. In this case however, the green light may be deliberately bent towards the first spacer 218 in the direction of the second liquid crystal section 208B, thereby entering the second liquid crystal section 208B, through the green color filter 214B and into the second light sensing section 216B. A second potential may analogously be applied between the third electrode section 202C and the conduction electrode 212 such that the green light passing through the liquid crystal section 208C is bent towards the second spacer 220, through the green color filter 214B and into second light sensing section 216B. By further maintaining the default potential across the second electrode section 202B and the conduction electrode 212, all of the green light entering the liquid crystal layer 208 is directed towards the green color filter 214B and entering the second light sensing section 216B. As such, the optical efficiency of the three-color image sensing device 200 for sensing green light is increased to approximately 300% of when the default potential is applied across each of the electrode sections 202A, 202B and 202C and the conduction electrode 212.

Analogously, the optical efficiency of the three-color image sensing device 200 can be improved for sensing red light and/or blue light as well, by applying the appropriate potentials across the electrode sections 202A, 202B and 202C and the conduction electrode 212. If the first spacer 218 and second spacer 220 are convex lens-shaped spacers, the bent light pass through the spacers may be focused to further improve the optical efficiency of the three-color image sensing device 200.

FIG. 3 shows a circuit block diagram for an example image sensing pixel 300, including inputs 322, 324, 326, 328 and 330, electrodes 352A, 352B, 352C and 352D, and transistors 354A, 354B, 354C and 354D. The electrode 352A and transistor 354A may be implemented as the first electrode section 202A of FIG. 2. Similarly, the electrode 352B and transistor 354B, and the electrode 352C and transistor 354C may be implemented as the second electrode section 202B and third electrode section 202C, respectively, of FIG. 2. The gates of the transistors 354A, 354B, 354C and 354D are connected to the input 326, while the source of the transistor 354A is connected to the input 324 and the drain of the transistor 354A is connected to the electrode 352A; the source of the transistor 354B is connected to the input 322 and the drain of the transistor 354B is connected to the electrode 352B; the source of the transistor 354C is connected to the input 328 and the drain of the transistor 354C is connected to the electrode 352C; and the source of the transistor 354D is connected to the input 330 and the drain of the transistor 354D is connected to the electrode 352D.

As arranged in FIG. 3, the image sensing pixel 300 can accommodate up to four different color sections. In one embodiment, the four color filters implemented in the image sensing pixel 300 may be red, green, blue and white, wherein the electrode section 202A is the portion of the image sensing pixel 300 for sensing red light, the electrode section 202B is the portion of the image sensing pixel 300 for sensing green light, the electrode section 202C is the portion of the image sensing pixel 300 for sensing blue light and the electrode section 202D is the portion of the image sensing pixel 300 for sensing white, or all light. In the case of when green light enters the image sensing pixel 300, the appropriate signals may be applied to the inputs 322, 324, 326, 328 and 330 such that the lights from the red, blue and white light sensing portions are bent towards the portion of the image sensing pixel 300 for sensing green light. As such, light loss due to color filtering in the image sensing pixel 300 is reduced and optical efficiency is improved. In alternative embodiments, the image sensing pixel 300 may be designed to accommodate different numbers of color options. For example, having filters for just the three primary colors red, green and blue may be sufficient to sense all color combinations.

Figure 4:
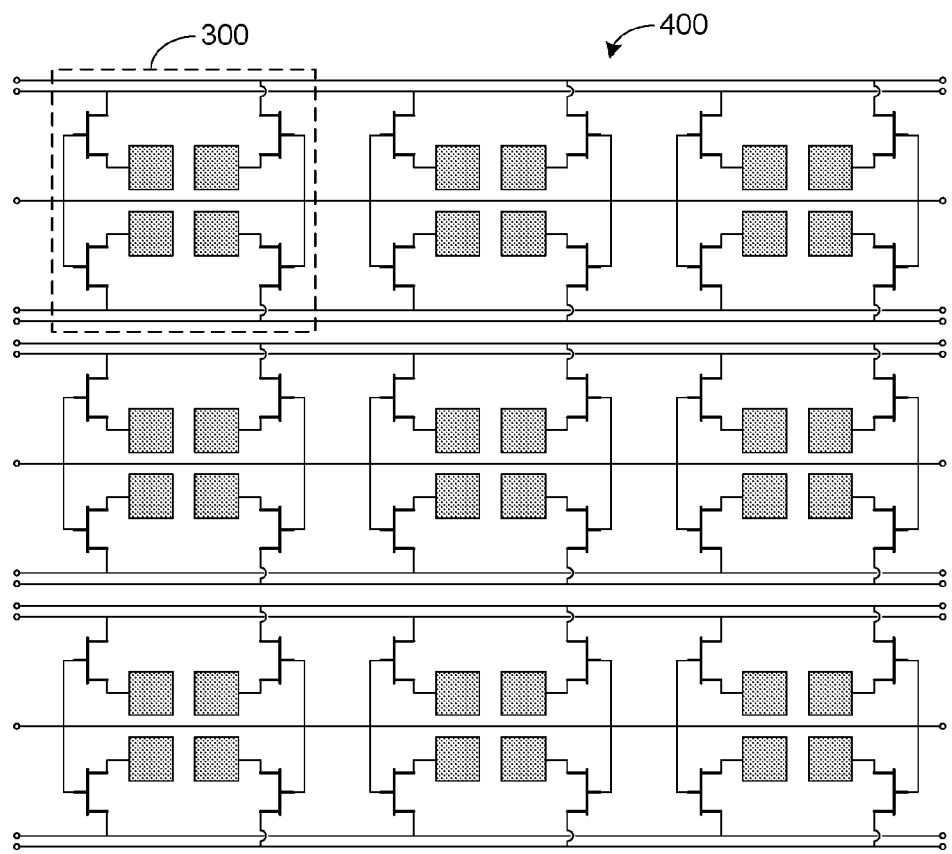
FIG. 4 is an illustrative diagram of an example array of image sensing pixels, including nine image sensing pixels arranged in a three by three format.

FIG. 4 shows an example array of image sensing pixels 400, including nine image sensing pixels arranged in a three by three format. Pixel structures similar to the example image sensing pixel 300 of FIG. 3 may be used as one or more of the nine image sensing pixels. Similar to the image sensing pixel 300, the four color filters in each image sensing pixel may be implemented to sense the colors red, green, blue and white. Alternative arrangements of image sensing pixels are also possible, and accordingly require different connection and control implementations.

Figure 5:
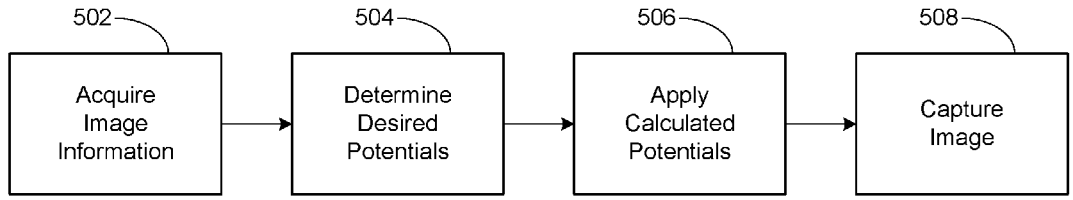
FIG. 5 is a flow diagram for optimizing optical efficiency using an optically intelligent image sensing device

In the embodiments of the image sensing devices discussed above, having preliminary information regarding the light entering each pixel is beneficial for improving the optical efficiency of the light sensing device. FIG. 5 shows a flow diagram for optimizing optical efficiency, including an acquire image information step 502, a determine desired potentials step 504, an apply determined potentials step 506 and a capture image step 508. The acquire image information step 502 involves acquiring a preliminary image with the image sensing device without optimization. After the acquire information step 502, the determine desired potentials step 504 involves determining what potentials should be applied to the pixel electrodes to optimize the optical efficiency of the pixels in the image sensing device. After determining the potentials to apply, the apply determined potentials step 506 takes place. Once the determined potentials have been applied, the image sensing device has been optically optimized and an image can be captured.

A digital camera is one example application that can benefit from this optically intelligent image sensing device. Improving the optical efficiency of a digital camera allows the camera to have greater optical zoom (as opposed to digital zoom which utilizes various forms of interpolation) without the need for additional lens. In one embodiment, the acquire image information step 502 may occur when the camera focuses on its target just prior to capturing the image.

Figure 6:
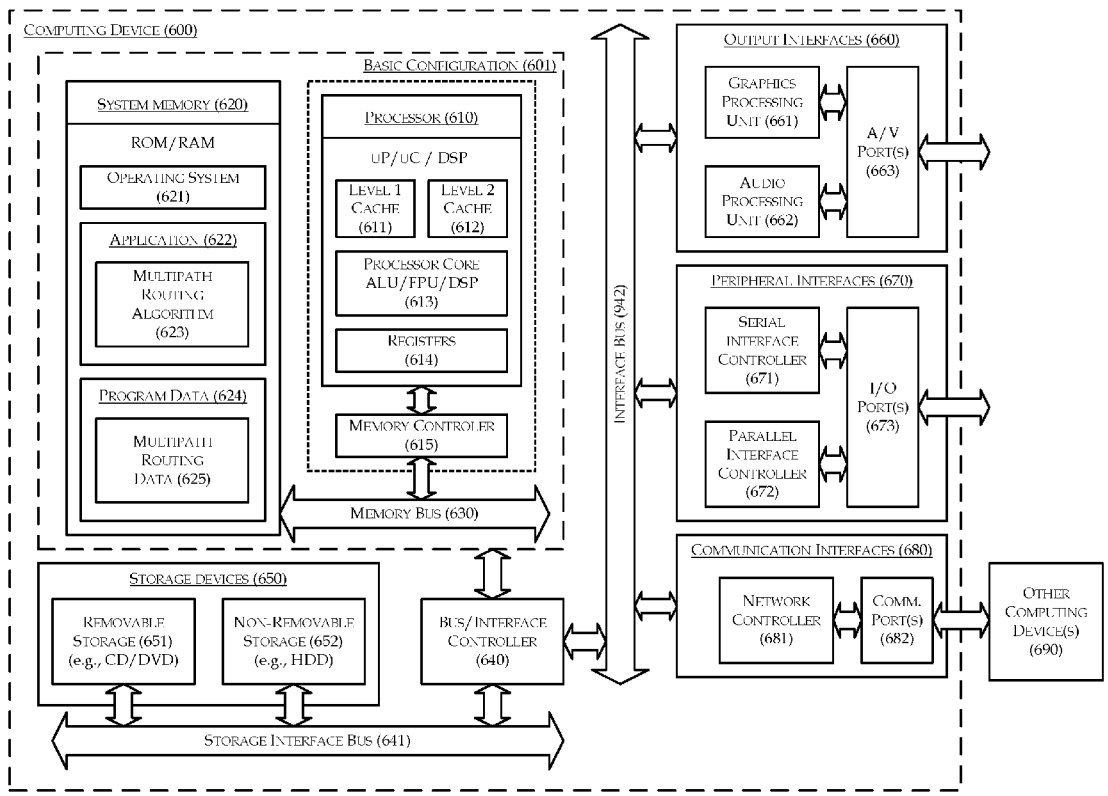
FIG. 6 is an illustrative diagram of an example computing device arranged for calculating and applying the appropriate potentials across electrode and conduction electrode pairs for optimizing optical efficiency.

FIG. 6 is a block diagram illustrating an example computing device 600 arranged for determining and applying the appropriate potentials across electrode and conduction electrode pairs for optimizing optical efficiency. In a very basic configuration 601, computing device 600 typically includes one or more processors 610 and system memory 620. A memory bus 630 can be used for communicating between the processor 910 and the system memory 620.

Depending on the desired configuration, processor 610 can be of any type including but not limited to a microprocessor (μP), a microcontroller (μC), a digital signal processor (DSP), or any combination thereof. Processor 610 can include one more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processor 610, or in some implementations the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 typically includes an operating system 621, one or more applications 622, and program data 624. Application 622 includes an image interpretation algorithm 623 that is arranged for calculating and applying the appropriate potentials across electrode and conduction electrode pairs for optimizing optical efficiency. Program Data 624 includes image interpretation data 625 that is useful for calculating the appropriate potentials to be applied across electrode and conduction electrode pairs for optimizing optical efficiency, as will be further described below. In some example embodiments, application 622 can be arranged to operate with program data 624 on an operating system 621 such that the appropriate potentials across electrode and conduction electrode pairs can be determined and applied for optimizing optical efficiency. This described basic configuration is illustrated in FIG. 6 by those components within dashed line 601.

Computing device 600 can have additional features or functionality, and additional interfaces to facilitate communications between the basic configuration 601 and any required devices and interfaces. For example, a bus/interface controller 640 can be used to facilitate communications between the basic configuration 601 and one or more data storage devices 650 via a storage interface bus 641. The data storage devices 650 can be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include an interface bus 642 for facilitating communication from various interface devices (e.g., output interfaces, peripheral interfaces, and communication interfaces) to the basic configuration 601 via the bus/interface controller 640. Example output interfaces 660 include a graphics processing unit 661 and an audio processing unit 662, which can be configured to communicate to various external devices such as a display or speakers via one or more A/V ports 663. Example peripheral interfaces 660 include a serial interface controller 671 or a parallel interface controller 672, which can be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which can be arranged to facilitate communications with one or more other computing devices 690 over a network communication via one or more communication ports 682. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
a light sensor layer;
a color filter layer on the light sensor layer;
a first electrode layer on the color filter layer;
a first glass substrate on the first electrode layer;
a liquid crystal layer on the first glass substrate;
a second glass substrate on the liquid crystal layer;
a second electrode layer on the second glass substrate; and
a resistive layer between the first and second electrode layers, where the resistive layer is at least partially transparent.

2. The apparatus of claim 1, wherein the color filter layer is configured to transmit red light, green light or blue light.

3. The apparatus of claim 1, wherein the color filter layer is configured to block light.

4. The apparatus of claim 1, wherein the color filter layer is configured to transmit white light.

5. An apparatus comprising:
a first image sensor device and a second image sensor device, where each image sensor device includes:
a light sensor layer;
a color filter layer on the light sensor layer;
a first electrode layer on the color filter layer;
a first glass substrate on the first electrode layer;
a liquid crystal layer on the first glass substrate;
a second glass substrate on the liquid crystal layer;
a second electrode layer on the second glass substrate; and
a resistive layer between the first and second electrode layers, where the resistive layer is at least partially transparent.

6. The apparatus of claim 5, wherein:
the first image sensor device includes a first color filter layer of a first color; and
the second image sensor device includes a second color filter layer of a second color different from the first color.

7. The apparatus of claim 5, each image sensor device further comprising a transistor, each transistor includes a gate, a source and a drain;
wherein
each gate of each transistor is coupled to a first input electrode;
a respective one of the source or the drain is coupled to a respective first or second electrode layer;
the other of the respective source or the drain is connected to a second input electrode.

8. The apparatus of claim 5, further comprising a third and fourth image sensor device, wherein:
the first image sensor device includes a first color filter layer that is configured to transmit red light;
the second image sensor device includes a second color filter layer that is configured to transmit blue light;
the third image sensor device includes a third color filter layer that is configured to transmit green light; and
the fourth image sensor device includes a fourth color filter layer that is configured to transmit white light.

9. The apparatus of claim 5, further comprising a spacer between the first and the second image sensing device.

10. The apparatus of claim 9, where the spacer is disposed in the liquid crystal layers.

11. The apparatus of claim 5, where each of the color filter layers is configured to transmit a respective one of red light, green light or blue light.

12. The apparatus of claim 5, wherein at least one of the color filter layers is configured to block light.

13. The apparatus of claim 5, wherein at least one of the color filter layers is configured to transmit white light.

14. An apparatus comprising:
an array of image sensor pixels, each pixel of the array comprising:
a first and a second image sensor device, where each image sensor device includes:
a light sensor layer;
a color filter layer on the light sensor layer;
a first electrode layer on the color filter layer;
a first glass substrate on the first electrode layer;
a liquid crystal layer on the first glass substrate;
a second glass substrate on the liquid crystal layer;
a second electrode layer on the second glass substrate; and
a resistive layer between the first and second electrode layers, where the resistive layer is at least partially transparent.

15. The apparatus of claim 14, wherein
each first image sensor device includes a color filter layer of a first color; and
each second image sensor device includes a color filter layer of a second color different from the first color.

16. The apparatus of claim 14, where each image sensor device further comprises a transistor, each transistor includes a gate, a source and a drain; and
wherein:
each gate of each transistor is coupled to a first input electrode;
a respective one of the source or the drain is coupled to a respective first or second electrode layer;
the other of the respective source or the drain is coupled to a second input electrode.

17. The apparatus of claim 14, where each pixel further comprises:
a third and fourth image sensor device;
wherein:
each first image sensor device includes a color filter layer that is configured to transmit red light;
each second image sensor device includes a color filter layer that is configured to transmit blue light;
each third image sensor device includes a color filter layer that is configured to transmit green light;
each fourth image sensor device includes a color filter layer that is configured to transmit white light.

18. The apparatus of claim 14, further comprising spacers between respective first and second image sensor devices in each pixel.

19. The apparatus of claim 14, where the spacers are disposed in the liquid crystal layers.

20. The apparatus of claim 14, wherein each of the color filter layers are configured to transmit a respective one of red light, green light, blue light, no light or white light.

* * * * *

UNITED STATES PATENT AND TRADEMARK OFFICE
CERTIFICATE OF CORRECTION

PATENT NO. : 8,508,674 B2  
APPLICATION NO. : 13/709670  
DATED : August 13, 2013  
INVENTOR(S) : Mishra et al.

Page 1 of 2

It is certified that error appears in the above-identified patent and that said Letters Patent is hereby corrected as shown below:

On the Title Page, in Item (71), under "Applicants", in Column 1, Line 1, delete "Juanpur" and insert -- Jaunpur --, therefor.

On the Title Page, in Item (72), under "Inventors", in Column 1, Line 1, delete "Juanpur" and insert -- Jaunpur --, therefor.

On Title Page 2, in Item (56), under "OTHER PUBLICATIONS", in Column 1, Line 3, delete "et al." and insert -- et al., --, therefor.

On Title Page 2, in Item (56), under "OTHER PUBLICATIONS", in Column 2, Line 1, delete "Compopnents" and insert -- Components --, therefor.

In the Drawings

In Fig. 6, Sheet 3 of 3, in Box "610", delete "uP/uC/ DSP" and insert -- µP/µC/DSP --, therefor.

In Fig. 6, Sheet 3 of 3, in Box "615", delete "MEMORY CONTROLER" and insert -- MEMORY CONTROLLER --, therefor.

In the Specification

In Column 3, Line 46, delete "device" and insert -- device. --, therefor.

In Column 4, Lines 20-21, delete "conduction layer 112" and insert -- conduction electrode layer 112 --, therefor.

In Column 8, Line 20, delete "(HDD)," and insert -- (HDDs), --, therefor.

Signed and Sealed this  
Thirty-first Day of December, 2013

Margaret A. Focarino  
*Commissioner for Patents of the United States Patent and Trademark Office*

CERTIFICATE OF CORRECTION (continued)
U.S. Pat. No. 8,508,674 B2

In Column 8, Line 22, delete "(SSD)," and insert -- (SSDs), --, therefor.

In Column 8, Line 32, delete "(DVD)" and insert -- (DVDs) --, therefor.